Figure 1:
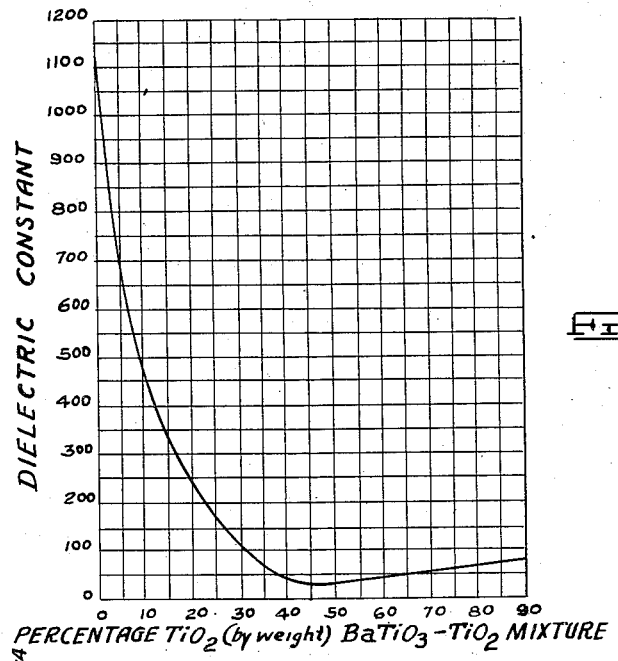
Figure 2:
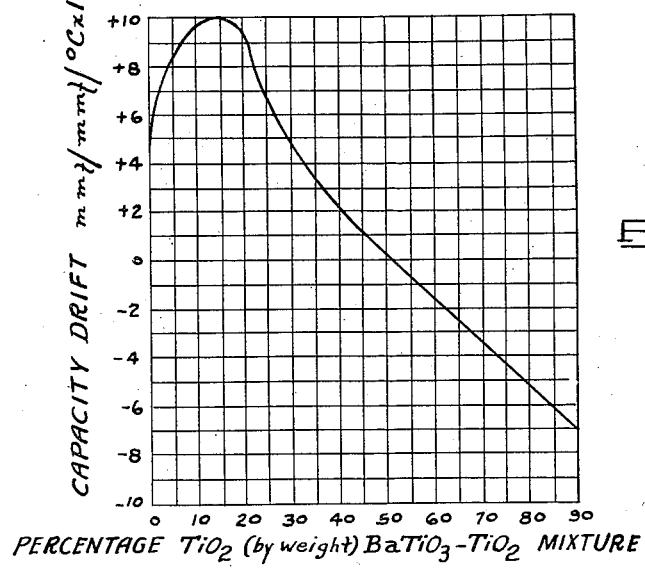

Oct. 21, 1947.   H. THURNAUER ET AL   2,429,588
INSULATING MATERIALS
Filed Oct. 2, 1941

HANS THURNAUER
JAMES DEADERICK
INVENTORS.
BY
THEIR ATTORNEY.

Patented Oct. 21, 1947

2,429,588

UNITED STATES PATENT OFFICE 2,429,588

INSULATING MATERIAL

Hans Thurnauer and James Deaderick, Chattanooga, Tenn., assignors to American Lava Corporation, Chattanooga, Tenn., a corporation of Tennessee Application October 2, 1941, Serial No. 413,340

2 Claims. (Cl. 106—39)

This invention relates to ceramic electric insulating materials having high dielectric constants and desirable temperature coefficients of capacity.

Ceramic materials containing titanium dioxide as one of the chief ingredients in a ceramic mixture are known to have an unusually high dielectric constant. Whereas other ceramic materials, such as porcelain, steatite, lava, glasses, etc., have dielectric constants between 5 and 8, ceramic materials containing a high percentage of titanium dioxide have dielectric constants between 10 and 112. There are in commercial use ceramic materials to be used as dielectrics in electric condensers which not only have a high dielectric constant but also have defined temperature coefficients of capacity. Such condensers are used as balancing or compensating units in oscillating circuits to compensate for capacitance and inductance changes due to temperature variations of either climate or heating of the oscillating circuit during operation. Such condensers have dielectric constant values between 6 and 110 and temperature coefficients of capacity between plus $1.2 \times 10^{-4}$ mmf./mmf./° C. to minus $7.5 \times 10^{-4}$ mmf./mmf./° C.

The positive temperature coefficient of capacity usually is connected with the lower dielectric constant (e. g., 6) and the highest negative temperature coefficient of capacity with the highest dielectric constant (e. g., 110). A material with zero temperature coefficient of capacity usually has a dielectric constant between 17 and 19.

It is, of course, highly desirable to employ materials as dielectrics in condensers which have a dielectric constant as high as possible in order to keep the physical dimensions of the condenser units as small as possible and at the same time have a dielectric capacity as high as possible.

We have now been able to prepare ceramic electric insulating materials, etc., which have exceptionally high dielectric constants and temperature coefficients of capacity within well defined limits.

Our invention is based on the discovery of the unusual and unexpected electric insulating characteristics of barium titanate, and of barium titanate when admixed with varying proportions of titanium dioxide. Depending upon the final properties, as to dielectric constant and temperature coefficient of capacity desired, the proportion of barium titanate and titanium dioxide can be varied between 100 parts of barium titanate and 0 parts of titanium dioxide and 10 parts of barium titanate and 90 parts of titanium dioxide, with a constant amount of additional fluxes, as is customary in this art, added to each mixture. In the practice of our invention we can use pure barium titanate, $BaTiO_3$, or we can use commercial barium titanate which has a typical analysis as follows: $TiO_2$ 34.3%, $BaO$ 63.9%, $Fe_2O_3$ .03%, other oxides 1.77%.

We shall now describe ways by which our invention can be practiced.

Finely divided barium titanate, finely divided titanium dioxide and finely divided fluxes are carefully mixed, either dry or wet, to form a homogeneous mixture. We prefer the mixture to be of such fineness as to pass a 325 mesh sieve, but this is a matter of choice. If the mixture has been prepared wet, it is carefully dried, then organic binders, such as wheat flour, dextrine, etc., are added, as usual in this art, to facilitate subsequent forming. The prepared ceramic "body" is then shaped according to well-known ceramic methods, such as compression pressing, extrusion, etc. In cases where a certain amount of plasticity is desired to form complicated shapes, moisture may be added to the powder to improve its plastic properties.

After forming, the shaped pieces are fired in ceramic kilns in oxidizing or inert atmosphere to prevent the formation of any lower oxide forms of titanium, other than $TiO_2$. The firing temperature has to be such that the pieces are burned to full vitrification and so that their moisture absorption is less than 0.1%. The temperature of firing has been found to be ordinarily between 1200° C. and 1400° C. For the maintenance of an inert atmosphere, we prefer the use of electrically fired kilns, but do not exclude kilns fired with other kinds of fuel.

The vitrified ceramic materials manufactured by the above-mentioned method are mechanically strong, have high dielectric strength, low dielectric loss factor at high frequency and are especially suitable as dielectric media in condensers or capacitors. Any of the ceramic materials in the series barium titanate-titanium dioxide may be useful as a dielectric in a ceramic condenser, depending on the temperature coefficient of capacity or the dielectric constant of the assembled unit desired, but of special interest are the following compositions:

Example I

| | Per cent |
|---|---|
| Barium titanate | 98 |
| Calcium phosphate, tribasic | 2 | as a flux.

This composition has been found to have the extremely high dielectric constant of 1110 (approximately ten times higher than titanium dioxide), a temperature coefficient of capacity between 40° C. and 80° C. of plus 12 × 10⁻⁴ mmf./mmf./°C., and a power factor of .20%.

*Example II*

| | Per cent |
|---|---|
| Barium titanate | 43 |
| Titanium dioxide | 55 |
| Calcium phosphate, tribasic | 2 | as a flux.

This composition has been found to have a dielectric constant of 37, a temperature coefficient of capacity between 40° C. and 80° C. of zero or close to zero mmf./mmf./°C., and a power factor of .08% at 1000 kc. This composition is of special interest because of its zero temperature coefficient of capacity and the comparatively high dielectric constant. Its approximate stoichiometric composition is $BaO.4TiO_2$.

In the above examples any of the common fluxes can be used in place of the calcium phosphate, and we make no claim to the use of such fluxes generally. In the preparation of ceramic insulating materials it is customary to mix the insulating material with a suitable flux before the material is fired. Likewise, the use of organic binders before firing is conventional.

We have prepared a whole series of barium titanate-titanium dioxide dielectrics, varying in proportions from 100% $BaTiO_3$ to 10% of $BaTiO_3$ and 90% of $TiO_2$. So that those skilled in the art may be appraised of the electrical characteristics of such mixtures, we have shown, on the appended single sheet of drawings, two graphs covering the system $BaTiO_3$—$TiO_2$.

We are aware that magnesium titanate has been used as a dielectric material, as in the patent to Albers-Schonberg 2,165,819, and make no claim thereto. Magnesium titanate has a dielectric constant of 15 to 18 whereas barium titanate has a dielectric constant of about 1100. Other important differences exist between the two substances, but the high dielectric constant of barium titanate is outstanding.

Having thus described our invention, what we claim is:

1. A ceramic material from which is formed an electric insulating member, said material comprising approximately 43% barium titanate and 55% titanium dioxide and a flux.

2. An electrical insulating member formed from material specified in claim 1, said insulating member having a dielectric constant of about 37 and a temperature co-efficient of capacity between 40° C. and 80° C. of substantially zero.

HANS THURNAUER.
JAMES DEADERICK.

REFERENCES CITED

The following references are of record in the file of this patent:

UNITED STATES PATENTS

| Number | Name | Date |
|---|---|---|
| 2,220,765 | Hirose et al. | Nov. 5, 1940 |
| 1,760,513 | Monk et al. | May 27, 1930 |
| 1,856,351 | Monk et al. | May 3, 1932 |
| 2,218,655 | Peterson | Oct. 22, 1940 |
| 2,214,703 | Thurnauer | Sept. 10, 1940 |
| 2,272,330 | Schupp | Feb. 13, 1942 |
| 2,069,903 | Soyck | Feb. 9, 1937 |
| 2,128,289 | Dubilier et al. | Aug. 30, 1938 |
| 2,165,819 | Albers-Schonberg | July 11, 1939 |
| 2,277,733 | Wainer | Mar. 31, 1942 |
| 2,277,734 | Wainer | Mar. 31, 1942 |

FOREIGN PATENTS

| Number | Country | Date |
|---|---|---|
| 719,067 | France | Nov. 13, 1931 |